United States Patent
Yousef et al.

(10) Patent No.: US 12,115,524 B1
(45) Date of Patent: Oct. 15, 2024

(54) METHOD OF PRODUCING ORGANOSELENIUM-BASED NANOCOMPOSITE

(71) Applicant: IMAM MOHAMMAD IBN SAUD ISLAMIC UNIVERSITY, Riyadh (SA)

(72) Inventors: Tarek Ahmed Yousef, Riyadh (SA); Hanan A. Althikrallah, Riyadh (SA); Saad Shaaban, Riyadh (SA); Mohsen Ahmed, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 18/665,066

(22) Filed: May 15, 2024

(51) Int. Cl.
| | |
|---|---|
| *B01J 37/04* | (2006.01) |
| *B01J 31/12* | (2006.01) |
| *B01J 35/39* | (2024.01) |
| *B01J 37/08* | (2006.01) |
| *B01J 37/24* | (2006.01) |
| *C07F 11/00* | (2006.01) |

(52) U.S. Cl.
CPC ............. *B01J 31/122* (2013.01); *B01J 37/04* (2013.01); *B01J 37/084* (2013.01); *B01J 37/24* (2013.01); *C07F 11/00* (2013.01); *B01J 35/39* (2024.01)

(58) Field of Classification Search
CPC . B01J 31/122; B01J 35/39; B01J 37/04; B01J 37/084; B01J 37/24; C07F 11/00
See application file for complete search history.

(56) References Cited

FOREIGN PATENT DOCUMENTS

| CN | 107814376 A | * | 3/2018 |
|---|---|---|---|
| CN | 108855196 A | * | 11/2018 |
| CN | 115207344 B | | 5/2023 |
| KR | 10-1262891 B1 | | 5/2013 |

OTHER PUBLICATIONS

Dos Reis et al. Chemical Engineering, 2023, 281, 119-129 (Year: 2023).*
Li CN108855196A English Translation (Year: 2018).*
Qian CN107814376A English Translation (Year: 2018).*
(Continued)

*Primary Examiner* — Brian D Walck
*Assistant Examiner* — Jordan W Taylor
(74) *Attorney, Agent, or Firm* — Oblon, McClelland, Maier & Neustadt, L.L.P.

(57) ABSTRACT

A method of producing an organoselenium-based nanocomposite includes acid-treating a mixture containing multi-walled carbon nanotubes (MWCNT) and palm waste with phosphoric acid to form an acid-treated mixture; carbonizing the acid-treated mixture to form a MWCNT/biochar; mixing the MWCNT-biochar with $TiO_2$ nanoparticles to form a $TiO_2$-MWCNT/biochar; chlorinating acyl groups present on the $TiO_2$-MWCNT/biochar to form a chlorinated $TiO_2$-MWCNT/biochar; reacting the chlorinated $TiO_2$-MWCNT/biochar with an organoselenium compound to form a Se—$TiO_2$-MWCNT/biochar.

20 Claims, 3 Drawing Sheets

(56) References Cited

OTHER PUBLICATIONS

Shaaban et al. Journal of Molecular Structure 2021, 1245, 131072 (Year: 2021).*
Zhang et al. Journal of Crystal Growth 2007, 304, 42-46 (Year: 2007).*
Sandra Zarska, et al., "Synthesis and structural studies of new selenium derivatives based on covalent functionalization of MWCNTs", International Journal of Molecular Sciences, vol. 24, Issue 4, 2023, Article 3299.
A. B. Suriani, et al., "Scaled-up prototype of carbon nanotube production system utilizing waste cooking palm oil precursor and its nanocomposite application as supercapacitor electrodes", Journal of Material Science: Materials in Electronics, vol. 26, Jul. 2016, pp. 11599-11605.

* cited by examiner

METHOD OF PRODUCING ORGANOSELENIUM-BASED NANOCOMPOSITE

BACKGROUND

Technical Field

The present disclosure is directed to photocatalysis technology, particularly a method of producing an organoselenium-based multi-walled carbon nanotubes (MWCNT)/biochar supported titanium oxide ($TiO_2$) nanocomposite.

Description of Related Art

The "background" description provided herein is to present the context of the disclosure generally. Work of the presently named inventors, to the extent it is described in this background section, as well as aspects of the description that may not otherwise qualify as prior art at the time of filing, are neither expressly nor impliedly admitted as prior art against the present invention.

Rapid population growth has resulted in increased energy usage worldwide. An efficient approach to resolving energy and environmental issues is the development of a sustainable source of renewable energy. Current approaches for developing a sustainable source of renewable energy include the use of solar and wind power. These energy sources, however, can be unreliable, thus requiring non-renewable sources still be used to meet the population's energy needs. Thus, it is desirable to create a method of sustainable and reliable energy conversion.

Photocatalysis technology has become an increasingly important research area for sustainable energy conversion and environmental cleanup efforts. When compared to conventional pollution treatment methods, photocatalytic degradation of environmental toxins offers numerous advantages to current methods, comprising low energy consumption, ease of operation, mild reaction conditions, and reduced secondary pollution. High conversion quantum efficiency catalysis material has been the target of increasing research for photocatalytic pollutant degradation technology.

Organoselenium compounds have shown promise in environmental remediation and sustainable energy applications. A notable property of organoselenium compounds is the ability to catalyze redox reactions, which can be harnessed for environmental cleanup processes. For example, certain organoselenium compounds have been investigated for their potential to degrade organic pollutants in water and soil through oxidation reactions, thereby helping restore contaminated sites. Organoselenium compounds have further been investigated for their photovoltaic properties, with potential applications being incorporation into solar energy conversion devices, such as organic photovoltaic cells.

Another compound that has been the topic of recent research is titanium dioxide ($TiO_2$). $TiO_2$ has strong oxidative powers and photostability under ultraviolet (UV) light, making it an effective tool for catalyzing a variety of reactions. In environmental remediation, $TiO_2$ photocatalysis can be utilized for the degradation of organic pollutants in the air and water. $TiO_2$ has a relatively low efficiency in utilizing visible light for photocatalytic reactions. Instead, $TiO_2$ primarily absorbs UV light, which constitutes only a small portion of the solar spectrum. When exposed to UV light, $TiO_2$ generates electron-hole pairs, leading to the formation of a highly reactive oxygen species, such as superoxide radicals and hydroxyl radicals. Due to the poor efficiency of $TiO_2$ in utilizing visible light, its practical application is limited for indoor or outdoor environments where UV light is not readily available. Researchers, therefore, have been actively working on modifying $TiO_2$ or developing new photocatalysts to enhance its performance under visible light.

Accordingly, it is one object of the present disclosure to provide an improved method of pollutant adsorption by facilitating electron transfer and enhancing the photocatalytic degradation of organic contaminants under both UV and visible light using organoselenium-based amidic acids integrated with MWCNT/Biochar-supported $TiO_2$ nanoparticles.

SUMMARY

In an exemplary embodiment, a method of producing an organoselenium-based nanocomposite is described. The method comprises acid-treating a mixture consisting of multi-walled carbon nanotubes (MWCNT) and palm waste with phosphoric acid to form an acid-treated mixture; carbonizing the acid-treated mixture to form a MWCNT/biochar; mixing the MWCNT-Biochar with $TiO_2$ nanoparticles to form a $TiO_2$-MWCNT/biochar; chlorinating acyl groups present on the $TiO_2$-MWCNT/biochar to form a chlorinated $TiO_2$-MWCNT/biochar; reacting the chlorinated $TiO_2$-MWCNT/biochar with an organoselenium compound to form a Se—$TiO_2$-MWCNT/biochar; wherein the organoselenium compound is selected from the group consisting of

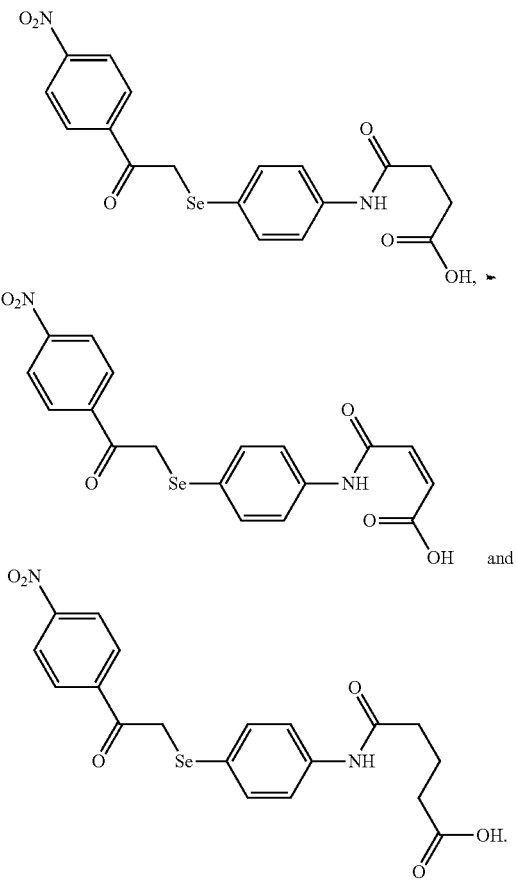

In some embodiments, the method further comprises reacting an organoselenium precursor with an anhydride and a reducing agent to form the organoselenium compound.

In some embodiments, the anhydride is selected from the group consisting of maleic anhydride, succinic anhydride, and glutaric anhydride.

In some embodiments, the organoselenium compound is an organoselenium-based amidic acid.

In some embodiments, the organoselenium compound is 4-((4-((2-(4-nitrophenyl)-oxoethyl)selanyl)phenyl)amino)-4-oxobut-2-enoic acid.

In some embodiments, the phosphoric acid is pyrophosphoric acid ($H_4P_2O_7$).

In some embodiments, the method further comprises crushing the palm waste to obtain a powder, wherein the powder has a size of 0.30 to 0.70 millimeters (mm).

In some embodiments, the acid-treated mixture comprises 1 to 5% by weight MWCNT.

In some embodiments, the acid-treated mixture comprises 2% by weight MWCNT.

In some embodiments, the acid-treated mixture is carbonized at a temperature of 500 to 900 degrees centigrade (° C.) under an inert gas flow for 10 to 50 minutes.

In some embodiments, the acid-treated mixture is carbonized at a temperature of 700° C. under an inert gas flow for 30 minutes.

In some embodiments, the inert gas flow has a flow rate of 50 to 350 milliliters (mL) per minute.

In some embodiments, the flow rate is 200 mL per minute.

In some embodiments, the method further comprises reacting the MWCNT/biochar with a chlorinating agent.

In some embodiments, the method comprises chlorinating the acyl groups present on the TiO$_2$-MWCNT/Biochar with oxalyl chloride ($C_2O_2Cl_2$).

In some embodiments, the solid fraction is calcined at a temperature of 400 to 800° C.

In some embodiments, the reducing agent is sodium borohydride (NaBH$_4$).

In some embodiments, the TiO$_2$ particles have an average particle size of 50 to 350 nanometers (nm).

In some embodiments, the aliphatic amine is a triethylamine.

In some embodiments, the method further comprises stirring the organoselenium compound for 1 to 3 hours and drying the organoselenium compound with an inert drying agent, where the drying agent is a sodium sulfate.

The foregoing general description of the illustrative present disclosure and the following disclosure are merely exemplary aspects of the teachings of this disclosure and are, therefore, not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
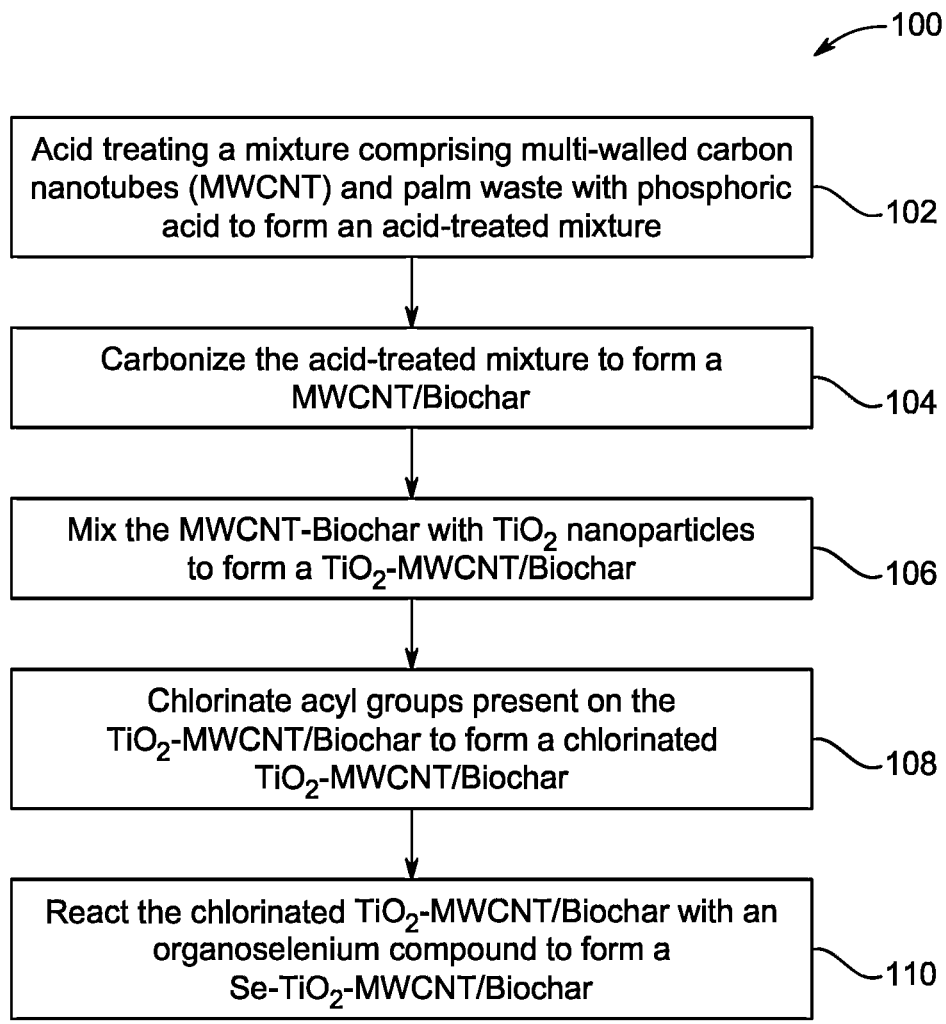
FIG. 1 is a flow chart of a method of producing an organoselenium-based nanocomposite, according to certain embodiments.

In the drawings, reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "nanocomposite" refers to a multiphase material in which, in contrast to micro composites, one of the phases has one, two, or three dimensions of less than 100 nm, or the composite phases have nanoscale distances between them.

As used herein, the term "carbon nanotubes" refers to cylindrical carbon structures with nanometer-scale diameters and lengths ranging from micrometers to millimeters. They can be thought of as graphene sheets rolled into seamless cylinders.

As used herein, the term "nanoparticle" refers to a particle wherein the longest diameter is less than or equal to 1000 nanometers.

As used herein, the term "biochar" refers to a type of charcoal produced from the thermal decomposition of organic materials, such as agricultural waste, wood chips, or plant residues, under low-oxygen conditions.

Aspects of the present disclosure are directed to a method of organoselenium-based nanocomposite obtained by integrating an organoselenium-based amidic acid with TiO$_2$, supported on a composite matrix of multi-walled carbon nanotubes (MWCNTs) with biochar. The nanocomposite enhances photocatalytic efficiency and stability thus offering an effective approach to environmental remediation and sustainable energy applications.

Organoselenium compounds are known for their redox activity and ability to engage in various chemical transformations, while TiO$_2$ is a widely studied photocatalyst due to its strong oxidative power and photostability under UV light. Combining these components on a support matrix that blends the high surface area and electrical conductivity of MWCNTs with the biochar's abundant, renewable, and carbon-rich nature, results in a synergistic effect because the MWCNTs, TiO$_2$, and organoselenium compound have been found to work in combination to increase the amount of visible light absorbed and available for photocatalytic reactions. This synergistic effect, therefore, is anticipated to improve the adsorption of pollutants, facilitate electron transfer, and enhance the photocatalytic degradation of organic contaminants under both UV and visible light.

Referring to FIG. 1, a schematic flow diagram of the method 100 for producing an organoselenium-based nanocomposite is illustrated. The order in which the method 100 is described is not intended to be construed as a limitation, and any number of the described method steps may be combined in any order to implement the method 100. Additionally, individual steps may be removed or skipped from the method 100 without departing from the spirit and scope of the present disclosure.

At step 102, method 100 comprises acid-treating a mixture comprising MWCNTs and palm waste with phosphoric acid to form an acid-treated mixture. The MWCNTs may be obtained from any source, for example, palm oil shells. The MWCNTs comprise several layers of graphene sheets arranged concentrically around a hollow core. These layers are typically separated by a distance of about 0.35 nm, which is the interlayer spacing of graphite. The number of layers in MWCNTs can vary, ranging from a few to several tens or even hundreds of layers. MWCNTs can be synthesized using various methods such as chemical vapor deposition (CVD), arc discharge, and laser ablation.

Similarly, the palm waste is obtained from various palm tree components, comprising leaves, bark, husk, trunk, leaf sheath, pedicels, and seeds. The palm waste may be washed with water before acid treatment to remove impurities. The water may be tap water, distilled water, bidistilled water, deionized water, deionized distilled water, reverse osmosis water, and/or some other water. After washing, the palm waste may be dried, preferably vacuum-dried at 90-120° C., preferably 100-110° C., preferably 105° C. for 1 to 3 hours, preferably 2 to 3 hours, most preferably hours prior to being acid treated. After drying, in some embodiments, the palm waste may be crushed to obtain a powder. The powder has an average size in the range of 0.30 to 0.70 mm, preferably 0.4 to 0.6 mm, most preferably 0.45 to 0.55 mm. The method of crushing the palm waste is not particularly limited and can be performed by a mixer, a mortar and pestle, ball milling, grinding, or a combination thereof.

Palm waste is rich in cellulose, hemicellulose, and lignin. Palm waste may be acid treated or otherwise pre-treated to isolate the cellulose. When acid treated, the palm waste produces a cellulose-rich solid fraction and a hemicellulose-rich liquor. It is preferred to use phosphoric acid, preferably pyrophosphoric acid ($H_4P_2O_7$), to acid treat the palm waste although other acids, such as sulfuric acid ($H_2SO_4$), hydrochloric acid (HCl), and nitric acid ($HNO_3$) may be used as well. In some embodiments, other methods of pre-treatment may be adopted, such as physical, chemical, biological, or a mixture thereof, to obtain a cellulose-rich fraction. In some embodiments, the choice of the acid is dependent on the composition of the palm waste. The acid-treated mixture comprises MWCNTs, preferably in a weight percentage of 1 to 5 wt. %, preferably 1 to 4 wt. %, preferably 1 to 3 wt. %, preferably 1 to 2 wt. %, preferably 2 wt. %.

At step 104, the method 100 comprises carbonizing the acid-treated mixture to form a MWCNT/biochar. Carbonizing or carbonization is a process by which solid residues with increasing content of the element carbon are formed from organic material, usually by pyrolysis in an inert atmosphere. In an embodiment, the carbonization is performed by heating the acid-treated mixture to a temperature of 500 to 900° C. at a heating rate of 5 to 20 degrees Celsius per minute (° C./min) to form the MWCNT/biochar. In a preferred embodiment, the heating is performed at a temperature of preferably 510° C., preferably 515° C., preferably 520° C., preferably 525° C., preferably 530° C., preferably 535° C., preferably 540° C., preferably 545° C., preferably 550° C., preferably 555° C., preferably 560° C., preferably 565° C., preferably 570° C., preferably 575° C., preferably 580° C., preferably 585° C., preferably 590° C., preferably 595° C., preferably 600° C., preferably 605° C., preferably 610° C., preferably 615° C., preferably 620° C., preferably 625° C., preferably 630° C., preferably 635° C., preferably 640° C., preferably 645° C., preferably 650° C., preferably 655° C., preferably 660° C., preferably 665° C., preferably 670° C., preferably 675° C., preferably 680° C., preferably 685° C., preferably 690° C., or preferably 695° C., preferably 700° C., preferably 705° C., preferably 710° C., preferably 715° C., preferably 720° C., preferably 725° C., preferably 730° C., preferably 735° C., preferably 740° C., preferably 745° C., preferably 750° C., preferably 755° C., preferably 760° C., preferably 765° C., preferably 770° C., preferably 775° C., preferably 780° C., preferably 785° C., preferably 790° C., preferably 795° C., preferably 800° C., preferably 805° C., preferably 810° C., preferably 815° C., preferably 820° C., preferably 825° C., preferably 830° C., preferably 835° C., preferably 840° C., preferably 845° C., preferably 850° C., preferably 855° C., preferably 860° C., preferably 865° C., preferably 870° C., preferably 875° C., preferably 880° C., preferably 885° C., preferably 890° C., preferably 895° C., preferably 900° C. In a preferred embodiment, the heating is performed at a temperature of out at 700° C.

Preferably, the heating temperature is held at about 700° C. for a 10 to 50 minutes to allow for complete carbonization of the biomass and decomposition of any remaining organic matter. During carbonization, the biomass undergoes pyrolysis, where volatile components are driven off, leaving behind carbon-rich material.

Biomass materials such as wood chips, crop residues, agricultural waste, or other organic matter are subjected to pyrolysis, typically at temperatures around 400 to 800° C., in a low-oxygen or oxygen-free environment/inert atmosphere. The inert atmosphere, preferably under inert $N_2$, prevents any side reactions from occurring during the carbonization process. The heating is carried out under an inert gas flow for 10 to 50 minutes, preferably 20 to 40 minutes, preferably 30 minutes. The inert gas flow is adjusted to a flow rate of 50 to 350 mL per minute, preferably 75 to 300 mL per minute, preferably 100 to 250 mL per minute, preferably 200 mL per minute.

In some embodiments, heating may be performed by placing the acid-treated mixture into a furnace such as a tube furnace, for example, in a ceramic crucible (e.g., an alumina crucible) or other forms of containment, and heating to the temperatures described above. The furnace is preferably equipped with a temperature control system, which may provide a heating rate of up to 50° C./min, or preferably up to 40° C./min, or preferably up to 30° C./min, preferably up to 20° C./min, preferably up to 10° C./min. The carbonization process results in a solid residue called MWCNT/biochar. The MWCNT/biochar comprises acid functional groups on its surface.

At step 106, the method 106 comprises mixing the MWCNT/biochar with $TiO_2$ nanoparticles to form a $TiO_2$-MWCNT/biochar. Modifying the MWCNT/biochar with $TiO_2$ nanoparticles aids in improving the photocatalytic performance of the nanocomposite. This modification may be performed via various methods like sol-gel, hydrothermal, or solvothermal processes, preferably sol-gel process. These methods allow control over the size, morphology, and crystallinity of the nanoparticles. The $TiO_2$ particles have an average particle size of 1 to 300 nm, preferably 10 to 250 nm, preferably 20 to 200 nm, preferably 30 to 150 nm, preferably 40 to 100 nm, most preferably 40 to 50 nm. Proper mixing helps to ensure uniform distribution of the $TiO_2$ nanoparticles to form the $TiO_2$-MWCNT/biochar. Techniques like sonication or mechanical stirring can be employed. The mixture ratio of the MWCNT/biochar with $TiO_2$ nanoparticles may depend on the desired loading of the $TiO_2$ nanoparticles on the MWCNT/biochar. If necessary, a binder can be used to enhance the adhesion between the $TiO_2$ nanoparticles and the MWCNT/biochar surface.

At step 108, the method 108 comprises chlorinating acyl groups present on the $TiO_2$-MWCNT/biochar to form a chlorinated $TiO_2$-MWCNT/biochar. In some embodiments, the $TiO_2$/MWCNT/biochar is chlorinated with a chlorinating agent such as thionyl chloride ($SOCl_2$), chlorosulfonic acid (ClSO₃H), calcium hypochlorite, chlorine, oxalyl chloride, phosphorus pentachloride, phosphorus trichloride, trichloroisocyanuric acid, etc. In a preferred embodiment, the chlorinating agent is oxalyl chloride (i.e., (COCl)₂). The chlorination step introduces chlorine functional groups onto the surface of the TiO₂-MWCNT/biochar, providing reactive sites for further functionalization. In a preferred embodiment, the chlorination is carried out by chlorinating acyl groups present on the TiO₂-MWCNT/biochar with oxalyl chloride. In a preferred embodiment, the chlorination is carried out at 40 to 80° C., preferably 50 to 70° C., most preferably 65° C. for 12 to 48 hours, preferably 16 to 40 hours, preferably 20 to 32 hours, most preferably 24 hours, under sonication to form the chlorinated TiO₂-MWCNT/biochar.

At step 110, the method 110 comprises reacting the chlorinated TiO₂-MWCNT/biochar with an organoselenium compound to form a Se—TiO₂-MWCNT/biochar. The organoselenium compound is one selected from

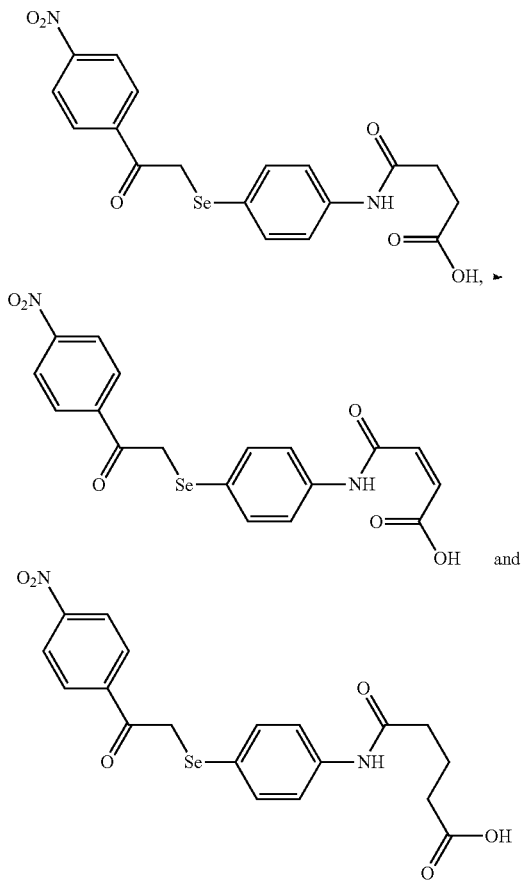

In an embodiment, the organoselenium compound is an organoselenium-based amidic acid. In some embodiments, the organoselenium compound is 4-((4-((2-(4-nitrophenyl)-oxoethyl)selanyl)phenyl)amino)-4-oxobut-2-enoic acid. This reaction is carried out in the presence of a base. The base may be organic or inorganic. In an embodiment, the base is organic, preferably an amine. The amine is an aliphatic amine, preferably a trialkylamine such as triethylamine.

In some embodiments, a precursor to the organoselenium compound may be used to produce the organoselenium compound needed to form the Se—TiO₂-MWCNT/Biochar. The organoselenium precursor may be reacted with an anhydride and a reducing agent to form a mixture, preferably while being stirred. The mixture is preferably stirred for 1 to 5 hours, preferably 2 to 4 hours, most preferably 2 to 3 hours, to obtain the organoselenium compound. The anhydride is one or more anhydrides selected from the group consisting of maleic anhydride, succinic anhydride, and glutaric anhydride. The reducing agent is preferably sodium borohydride (NaBH₄). The organoselenium compound obtained may then be optionally dried using an inert drying agent. Preferred examples of inert drying agents include calcium chloride, potassium carbonate, sodium sulfate, and calcium sulfate. In some embodiments, the drying agent is a sodium sulfate.

In another embodiment, the sequence of the method steps may be altered to carbonize the MWCNT/biochar before the acid-treating of the MWCNT/biochar. In this embodiment, the method comprises isolating the MWCNTs from the palm date waste, then carbonizing the MWCNTs to form the MWCNT/biochar. In this embodiment, the carbonization is performed by heating the MWCNTs to a temperature of 500 to 900° C. at a heating rate of 5 to 20 degrees Celsius per minute (° C./min) to form the MWCNT/biochar. In a preferred embodiment, the heating is performed at a temperature of preferably 510 to 890° C., preferably 520 to 880° C., preferably 530 to 870° C., preferably 540 to 860° C., preferably 550 to 850° C., preferably 560 to 840° C., preferably 570 to 830° C., preferably 580 to 820° C., preferably 590 to 810° C., preferably 600 to 800° C., preferably 610 to 790° C., preferably 620 to 780° C., preferably 630 to 770° C., preferably 640 to 760° C., preferably 650 to 750° C., preferably 660 to 740° C., preferably 670 to 730° C., preferably 680 to 720° C., preferably 690 to 710° C. In a preferred embodiment, the heating is performed at a temperature of out at 700° C. Preferably, the heating temperature is held at about 700° C. for a 10 to 50 minutes to allow for complete carbonization of the MWCNTs and decomposition of any remaining organic matter. The inert atmosphere, preferably under inert N₂, prevents any side reactions from occurring during the carbonization process. The heating is carried out under an inert gas flow for 10 to 50 minutes, preferably 20 to 40 minutes, preferably 30 minutes. The inert gas flow is adjusted to a flow rate of 50 to 350 mL per minute, preferably 75 to 300 mL per minute, preferably 100 to 250 mL per minute, preferably 200 mL per minute. In this embodiment, heating may be performed by placing the MWCNTs into a furnace such as a tube furnace, for example, in a ceramic crucible (e.g., an alumina crucible) or other forms of containment, and heating to the temperatures described above. The furnace is preferably equipped with a temperature control system, which may provide a heating rate of up to 50° C./min, or preferably up to 40° C./min, or preferably up to 30° C./min, preferably up to 20° C./min, preferably up to 10° C./min. The carbonization process results in a solid residue called MWCNT/biochar. The MWCNT/biochar comprises acid functional groups on its surface.

In this embodiment, after the carbonization of the MWCNTs to form the MWCNT/biochar, the MWCNT/biochar is acid treated with phosphoric acid to form an acid-treated MWCNT/biochar. It is preferred to use phosphoric acid, preferably pyrophosphoric acid (H₄P₂O₇), to acid treat the MWCNT/biochar although other acids, such as sulfuric acid (H₂SO₄), hydrochloric acid (HCl), and nitric acid (HNO₃) may be used as well. In some embodiments, the choice of the acid is dependent on the composition of the MWCNT/biochar. The acid-treated MWCNT/biochar mixture comprises MWCNTs, preferably in a weight percentage of 1 to 5 wt. %, preferably 1 to 4 wt. %, preferably 1 to 3 wt. %, preferably 1 to 2 wt. %, preferably 2 wt. %.

EXAMPLES

The following examples demonstrate a method of producing an organoselenium-based nanocomposite, as described herein. The examples are provided solely for illustration and are not to be construed as limitations of the present disclosure, as many variations thereof are possible without departing from the spirit and scope of the present disclosure.

Example 1: Synthesis of the Organoselenium-Based Amidic Acids

Figure 2:
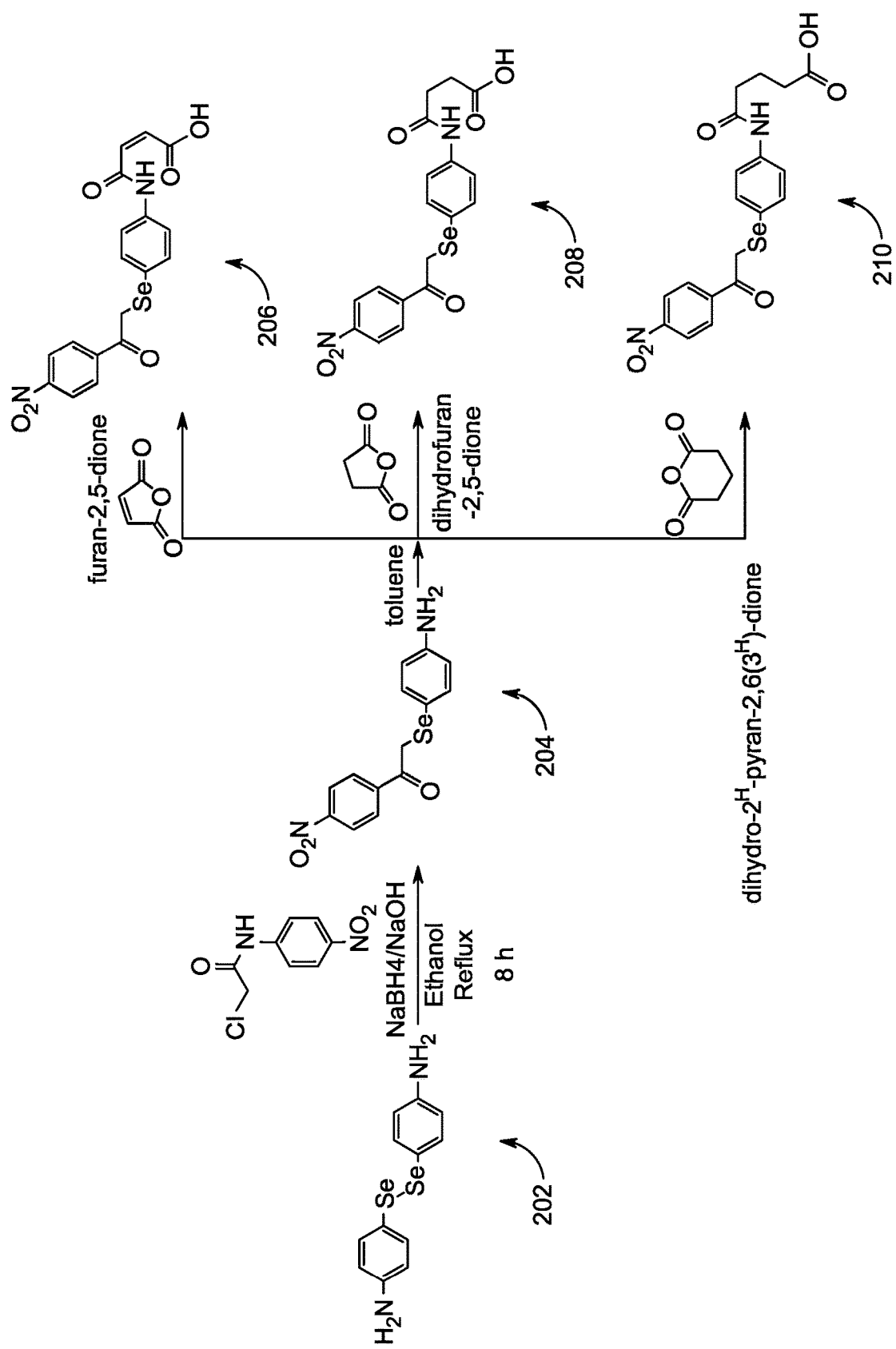
FIG. 2 is a schematic illustration depicting the synthesis of organoselenium-based amidic acids according to certain embodiments.

FIG. 2 illustrates the synthesis of the organoselenium-based amidic acids. The process initiates with dissolving 1 millimolar (mmol) of 4,4'-diselanediyldianiline (202) in 20 milliliters (mL) of ethanol, 1 mmol of NaOH, 2.2 mmol of 2-chloro-N-(4-nitrophenyl)acetamide, and 5 mmol of NaBH$_4$ were added to the mixture, which was then stirred for 2 hours. Ethyl acetate was used to extract the solvent after removing it under low pressure. The latter was sufficiently pure to yield 2-((4-aminophenyl)selanyl)-1-(4-nitrophenyl)ethan-1-one (204) after being dried with sodium sulfate and removed under reduced pressure. The corresponding amidic acids were produced as follows by the reaction of two different anhydrides, namely maleic, succinic, and glutaric anhydrides as follows. 2-((4-aminophenyl)selanyl)-1-(4-nitrophenyl)ethan-1-one (204) (1 mmol) and maleic anhydride/succinic anhydride/glutaric anhydride (1.2 mmol) were dissolved in toluene (5 mL) and the mixture was stirred at room temperature for 12 hours. The formed precipitate was filtered and washed with hot toluene and then with water to give at least one amidic acid, of enough purity, represented by the following structures

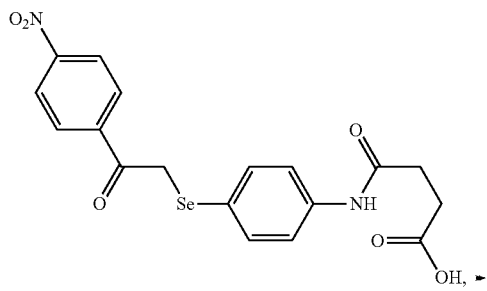

(206)

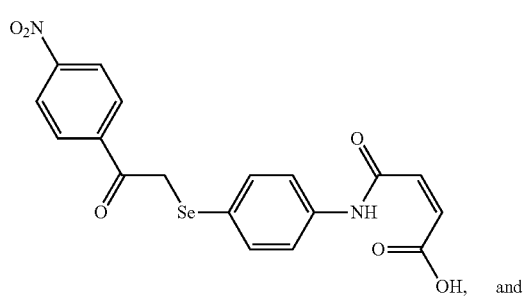

(208)

and

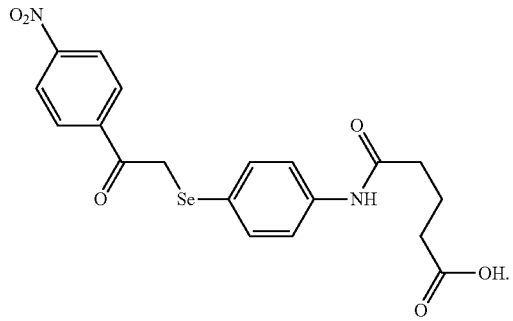

(210)

Example 2: Synthesis Steps of (Se@TiO$_2$-MWCNT/Biochar)

In the synthesis steps of (Se@TiO$_2$-MWCNT/biochar), the first step in creating the MWCNT/biochar hybrid catalyst with organoselenium is to gather various palm waste materials from a farm in Al-Hassa City, Saudi Arabia, such as leaves, bark, and husk. After that, the palm waste sample was cleaned, vacuum-dried, crushed, and refluxed into H$_4$P$_2$O$_7$ with MWCNTs. It was then carbonized at 700° C. in an inert N$_2$ atmosphere and cleaned and dried at 105° C. for the entire night. Finally, a wet-impregnation hybridization technique was used to functionalize this MWCNT/biochar using an organoselenium precursor and a TiO$_2$ catalyst. The appropriate loading of the catalyst on the biochar will determine the mixture ratio. If required, the adhesion between the catalyst nanoparticles and the surface of the biochar can be improved by adding a binder.

Example 3: Synthesis of MWCNTs Incorporated Activated Biochar (MWCNT/Biochar)

To synthesize MWCNTs incorporated activated biochar (MWCNT/biochar), the palm waste materials were repeatedly washed with water and vacuum dried for 3 hours at 105° C. The sample was crushed to a size of approximately 50 mesh sieves. Then, 15 g powder of sieved milled was refluxed into 100 mL of H$_4$P$_2$O$_7$ and 2 wt. % of MWCNT. The soaked material was mixed using sonication for 24 hours at room temperature. Then, the sample was dried in an oven at 105° C. Next, acid-soaked palm waste powder was subjected to carbonization slowly in a tubular furnace at 700° C. under N$_2$ flow at 200 mL/min for 30 min, with a 10° C./min heating rate to obtain the MWCNT/biochar catalyst and subsequently washed with 300 mL of hot deionized water until the pH of the filtrate was roughly equal to 7. The MWCNT/biochar-COOH that was produced was filtered and dried in a vacuum at 55° C. for 24 hours.

Example 4: Synthesis of (Se@MWCNT/Biochar)

Figure 3:
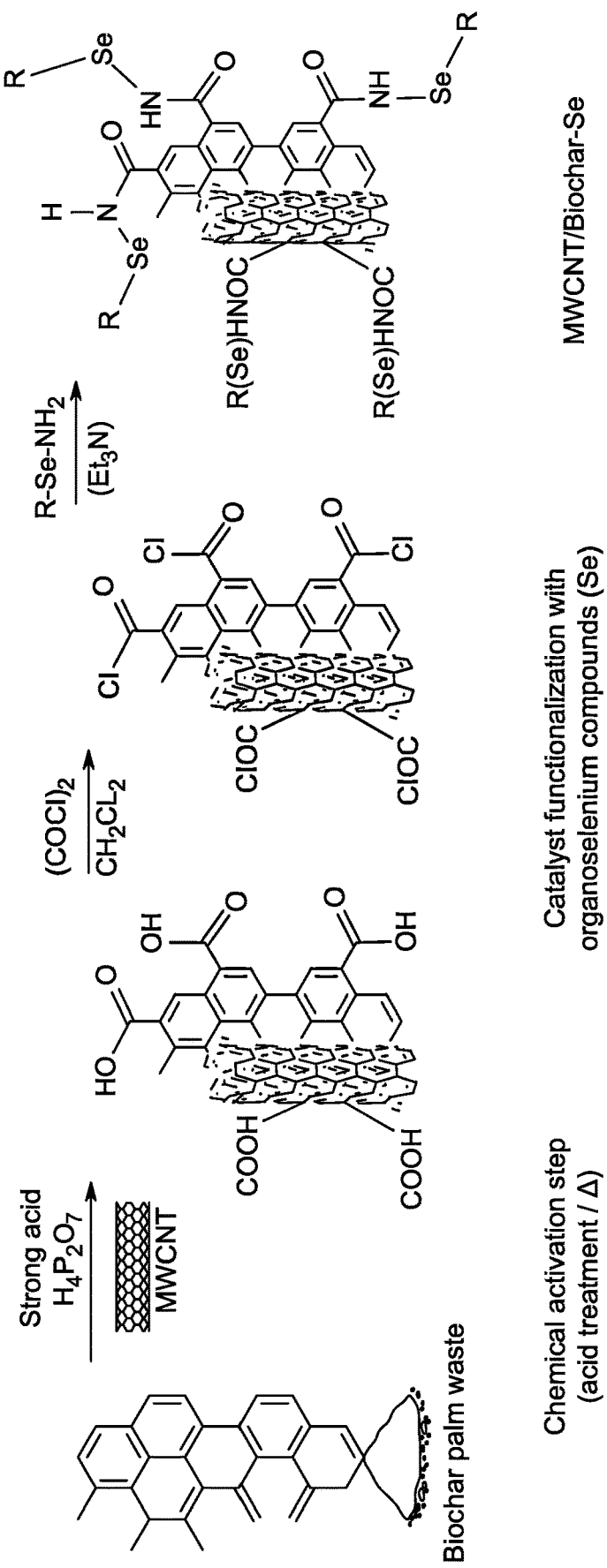
FIG. 3 is a reaction scheme depicting the synthesis of multi-walled carbon nanotubes (MWCNT)/activated biochar hybrid with the organoselenium compounds, according to certain embodiments.

The MWCNT/biochar-COOH was treated with oxalyl chloride (COCl)$_2$ to convert the carboxylic group into an acid chloride group (MWCNT/biochar-COCl). The prepared MWCNT/biochar-COCl was susceptible to reacting with organoselenium precursor and produced functionalized MWCNT/biochar with organoselenium derivatives. In brief, MWCNT/biochar-COOH was refluxed with an excess of oxalyl chloride using an ultrasonic bath for 24 hours at 65° C. to form MWCNT/biochar-COCl. Next step, the triethyl amine (Et$_3$N; 1 eq) was added to a solution of readily available organoselenium precursor, followed by dropwise addition of MWCNT/biochar-COCl at 0° C. for 6 hours and subsequent stirring at room temperature for six hours more. The reaction mixture was subsequently filtered and washed with excess deionized water. The resulting black solid was dried under a vacuum, and the Se@MWCNT/biochar derivative was obtained. The summary of the synthesis steps is shown in FIG. 3

Example 5: Synthesis of (TiO$_2$@Se-MWCNT/Biochar)

A technique used to create MWCNT/biochar-supported TiO$_2$ nanocomposites is sol-gel. This process involves pyrolyzing the biomass to create biochar. The resulting biochar is then chemically treated by refluxing it into acids with MWCNT, carbonizing it at 700° C. in an inert N$_2$ atmosphere, and washing and drying it at 105° C. for an entire night. The MWCNT/Biochar that has been acid-treated is then combined with an ethanol slurry that contains TiO$_2$ nanoparticles. After that, the entire slurry mixture is divided into liquid and solid fractions. After that, the slurry's solid fraction is calcined between 500 and 700° C. to create a TiO$_2$ nanocomposite supported by biochar that is incredibly stable.

Numerous modifications and variations of the present disclosure are possible in light of the above teachings. It is therefore to be understood that within the scope of the appended claims, the invention may be practiced otherwise than as specifically described herein.

The invention claimed is:

1. A method of producing an organoselenium-based nanocomposite, comprising:
   acid treating a mixture comprising multi-walled carbon nanotubes (MWCNT) and palm waste with phosphoric acid to form an acid-treated mixture,
   carbonizing the acid-treated mixture to form a MWCNT/Biochar;
   mixing the MWCNT/Biochar with TiO$_2$ nanoparticles to form a TiO$_2$-MWCNT/Biochar;
   chlorinating acyl groups present on the TiO$_2$-MWCNT/Biochar to form a chlorinated TiO$_2$-MWCNT/Biochar; and
   reacting the chlorinated TiO$_2$-MWCNT/Biochar with an organoselenium compound and an aliphatic amine to form a Se—TiO$_2$-MWCNT/Biochar;
   wherein the organoselenium compound is selected from the group consisting of

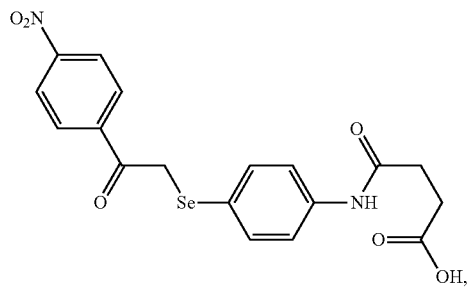

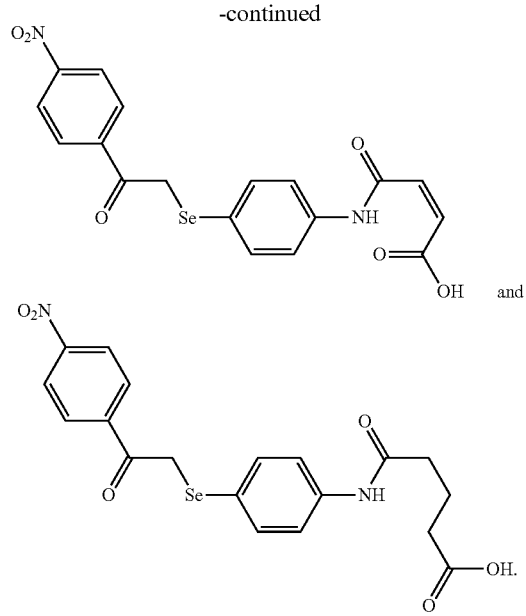

2. The method of claim 1, further comprising:
   reacting an organoselenium precursor with an anhydride and a reducing agent to form the organoselenium compound.

3. The method of claim 2, wherein the anhydride is selected from the group consisting of maleic anhydride, succinic anhydride, and glutaric anhydride.

4. The method of claim 1, wherein the organoselenium compound is an organoselenium-based amidic acid.

5. The method of claim 1, wherein the organoselenium compound is 4-((4-((2-(4-nitrophenyl)-oxoethyl)selanyl)phenyl)amino)-4-oxobut-2-enoic acid.

6. The method of claim 1, wherein the phosphoric acid is pyrophosphoric acid (H$_4$P$_2$O$_7$).

7. The method of claim 1, further comprising:
   crushing the palm waste to obtain a powder,
   wherein the powder has a size of 0.30 to 0.70 mm.

8. The method of claim 1, wherein the acid-treated mixture comprises 1 to 5% by weight MWCNT.

9. The method of claim 1, wherein the acid-treated mixture comprises 2% by weight MWCNT.

10. The method of claim 1, wherein the acid-treated mixture is carbonized at a temperature of 500 to 900° C. under an inert gas flow for 10 to 50 minutes.

11. The method of claim 1, wherein the acid-treated mixture is carbonized at a temperature of 700° C. under an inert gas flow for 30 minutes.

12. The method of claim 10, wherein the inert gas flow has a flow rate of 50 to 350 mL per minute.

13. The method of claim 10, wherein the inert gas flow has a flow rate of 200 mL per minute.

14. The method of claim 1, further comprising:
   reacting the MWCNT/biochar with a chlorinating agent.

15. The method of claim 1, wherein the chlorinating comprises reacting the acyl groups present on the TiO$_2$-MWCNT/Biochar with oxalyl chloride (C$_2$O$_2$Cl$_2$).

16. The method of claim 1, further comprising:
   separating a solid fraction of the Se—TiO$_2$-MWCNT/Biochar from the liquid fraction, then calcining the solid fraction,
   wherein the solid fraction is calcined at a temperature of 400 to 800° C.

17. The method of claim 2, wherein the reducing agent is sodium borohydride (NaBH$_4$).

18. The method of claim 1, wherein the TiO$_2$ particles have an average particle size of 50 to 350 nm.

19. The method of claim 1, wherein the aliphatic amine is a triethylamine.

20. The method of claim 2, further comprising:
   stirring the organoselenium compound for 1 to 3 hours; and
   drying the organoselenium compound with an inert drying agent,
   wherein the drying agent is sodium sulfate.

* * * * *